United States Patent [19]
Rao

[11] Patent Number: 5,845,104
[45] Date of Patent: Dec. 1, 1998

[54] METHOD AND SYSTEM FOR READING DATA FROM AND WRITING DATA TO A JUKEBOX USING A CACHE

[75] Inventor: Mahesh Chandra Rao, San Jose, Calif.

[73] Assignee: Mitsubishi Chemical, America, Inc., San Jose, Calif.

[21] Appl. No.: 554,981

[22] Filed: Nov. 13, 1995

[51] Int. Cl.[6] .................................................. G06F 12/12
[52] U.S. Cl. .................... 395/440; 395/439; 395/438; 395/404; 364/DIG. 1
[58] Field of Search .................................. 395/622, 438, 395/404; 369/30

[56] References Cited

U.S. PATENT DOCUMENTS

| | | | |
|---|---|---|---|
| 4,766,581 | 8/1988 | Korn et al. | 369/30 |
| 5,438,674 | 8/1995 | Keele et al. | 395/404 |
| 5,504,873 | 4/1996 | Martin et al. | 395/438 |
| 5,530,850 | 6/1996 | Ford et al. | 395/622 |

*Primary Examiner*—Tod R. Swann
*Assistant Examiner*—David C. Langjahr
*Attorney, Agent, or Firm*—Oblon, Spivak, McClelland, Maier & Neustadt, P.C.

[57] ABSTRACT

A method and system for improving the transfer performance of a jukebox containing multiple media, either single-sided or double-sided, which, although independent, act as a single contiguous drive or volume. By caching writes in one embodiment and caching reads and writes in another embodiment, performance increases by preventing unnecessary disc swapping between the drive or drives of the jukebox. In operation, writes to the media currently in the drive are written through to the media and writes to all other media are cached while the cache does not have a predetermined utilization. When the cache has the predetermined utilization, a different media is placed in the drive and any cached or pending writes for the newly inserted media are sent to the newly inserted media and any corresponding cache entries are cleared.

22 Claims, 7 Drawing Sheets

METHOD AND SYSTEM FOR READING DATA FROM AND WRITING DATA TO A JUKEBOX USING A CACHE

BACKGROUND OF THE INVENTION

1. Field of the Invention

This invention relates to data transfer to and from plural sectors/clusters of multiple independent storage media within a jukebox.

2. Discussion of the Background

The demand for increased sizes for digital storage media continues as users move from requiring megabytes of storage, to store programs and data files, to requiring gigabytes and terabytes worth of storage to store imaged documents, audio clips, digital movies, etc. The traditional mass storage media, tape, is a highly cost efficient storage means because tape does not require that the electronics to manipulate the tape be included in each cartridge. Rather, a single tape reader with the expensive control circuitry is purchased and new, cheap media is purchased separately. Tapes are also advantageous in that they are easy to make copies of, easy to store and resilient to damage. However, tape has an inherent disadvantage that it is not a random access storage media, rather it is sequential and requires linear streaming from a present position, past any intermediate data, to a desired position.

Disk-based media (i.e., hard disks, CD ROMs, magneto-optical discs and floppy disks) overcome the above-mentioned disadvantageous feature of tape because they are random access and may seek to any sector on the storage media rapidly. However, the total size of any of these random access storage media is often small in comparison to tape and is constrained to be small based on site constraints. Often these media are no bigger than the size of a compact disc. Furthermore, it would be disadvantageous to have a few large platters, which, when subject to mechanical failures, would render useless all the data on the media.

Instead, multi-platter storage mechanisms have been developed which enable a series of physically separate media to be joined to look like a single large media. Hard disks with plural platters simulate a larger media by concatenating the storage space of the individual platters. For processing purposes, the plural platters are split into a series of cylinders, tracks, sectors and heads. A cylinder is a contiguous concentric ring encompassing a track on each of the platters. A track is a single contiguous ring on a single surface of one of the platters and is composed of multiple sectors. For each sector, there are usually two corresponding platter surfaces per platter which are designated by a head number. Therefore, any sector on the hard disk can be uniquely identified by its cylinder, track, sector and head position. However, hard disks have the disadvantages of requiring a permanently closed structure for housing the media, and the lose capabilities of the whole drive when one head or platter is damaged. Hard disks also have the disadvantage of requiring that the read/write/control electronics be provided in each drive, increasing the cost of the storage capacity.

These disadvantages are overcome by using a jukebox which can read and write removable media, such as cartridges or magneto-optical discs. By using removable media, a permanently closed structure is not required, backups of individual discs/cartridges can be made and cost can be reduced by providing only a single set of read/write/control electronics and duplicating just the media. Previously known jukebox systems have been limited in their efficiency by the method they employed to read and write data from the individual discs or cartridges which caused excessive media swapping. Typically when known jukebox systems write to the cartridges of a system, the following procedure is used. First the first cartridge comprising the logical file system is inserted into the drive of the jukebox and the File Allocation Table (FAT) is read so that the operating system may determine what areas are free. Next, the first cartridge is ejected and replaced by a corresponding cartridge which has free sectors to be written. Plural sectors of data are filled as requested by the operating system. For the next request, the second cartridge must be ejected so that the FAT can again be read to determine where the next sector can be found for a read request or where a next sector is to be written for a write request. This two step process of reading the FAT so that the actual file can be found causes wear and tear on the mechanical cartridge exchange system and reduces the mean time between failures (MTBF).

SUMMARY OF THE INVENTION

It is an object of the present invention to overcome the deficiencies of prior art jukebox systems by using caching.

It is another object of the present invention to provide a jukebox controller system with a means for caching writes to individual media (cartridges or discs) in a jukebox so as to improve the transfer performance between a computer and the jukebox.

It is yet another object of the present invention to provide a method for caching writes to a jukebox to improve the efficiency of the transfer between a computer system and the jukebox.

It is another object of the present invention to provide a jukebox controller system with a means for caching reads and writes to individual media (cartridges or discs) in a jukebox so as to improve the transfer performance between a computer and the jukebox.

It is yet another object of the present invention to provide a method for caching reads and writes to a jukebox to improve the efficiency of the transfer between a computer system and the jukebox.

The above and other objects are achieved by a system according to a first embodiment of the present invention for controlling a jukebox, including at least one drive, and plural recordable media (cartridges or discs) to be read from and written to as a simulated single contiguous drive or volume, the system comprising: a cache including plural entries for storing sectors corresponding to sectors on the plural removable media; and a controller for reading data from and writing data to the cache, comprising: means for writing data to the cache when a current media in the at least one drive does not contain a sector to be written, means for writing data to a sector of the current media when the current media contains a sector to be written, and means for flushing the cache to respective media when the cache has a predetermined utilization.

The above and other objects are achieved by a system according to a second embodiment of the present invention for controlling a jukebox, including at least one drive, and plural recordable media (cartridges or discs) to be read from and written to as a simulated single contiguous drive or volume, the system comprising: a cache including plural entries for storing sectors corresponding to sectors on the plural removable media; means for initializing the cache; means for receiving a media request; means for determining a type of the received media request as one of a read and write request; means for reading and returning a sector from the cache if the read request requests a sector stored in the cache; means for reading and returning a sector from a current media in the at least one drive if the read request requests a sector stored on the current media; first means for changing to a new media; means for returning data of a sector from the new media; means for writing data of a sector to the current media if the write request requests data of a sector on the current media be stored; means for writing data of a sector to the cache if the write request requests data of a sector not on the current media be stored and the cache does not have a predetermined utilization; second means for changing to a new media when the cache has a predetermined utilization; and means for writing data of a sector from the cache to the new media.

The above and other objects are achieved by a system according to a third embodiment of the present invention for controlling a jukebox, including at least one drive, and plural recordable media (cartridges or discs) to be read from and written to as a simulated single contiguous drive or volume, the system comprising: a cache with plural entries including a data area and status information for each entry, means for receiving requests, means for determining the type of request received and the physical media to which the request corresponds, means for determining if a sector is present in the cache, means for reading a requested sector from the cache, means for passing the requested sector back to a requester, means for ejecting the current media when a requested sector to be read is not in the cache or on the media in the drive, means for inserting into the drive the new media with the sector to be read, means for flushing any pending writes in the cache for the newly inserted media to the newly inserted media, means for clearing part of the cache to make room for the read sector, means for caching the read sector when the sector is not in the cache, means for clearing the cache of the sectors written to the newly inserted media, means for writing to the media in the drive if the sector request is a write request and the sector to be written corresponds to the media presently in the drive, means for determining if the cache has a predetermined utilization, means for writing a sector to the cache if the cache does not have a predetermined utilization, means for ejecting the media in the drive when the cache is determined to have a predetermined utilization, means for determining the new media to be entered into the drive based on the cached and pending write means for writing to the new media any corresponding pending or cached write requests and means for clearing the cache of any sectors written to the new media.

The present invention creates the illusion of a single logical drive from the multiple independent storage media by caching writes to individual discs/cartridges in a jukebox to increase the efficiency of writes to the system by reducing cartridge swapping. The present invention further caches reads from and writes to the cartridges in a jukebox to increase the efficiency of the system by reducing cartridge swapping.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
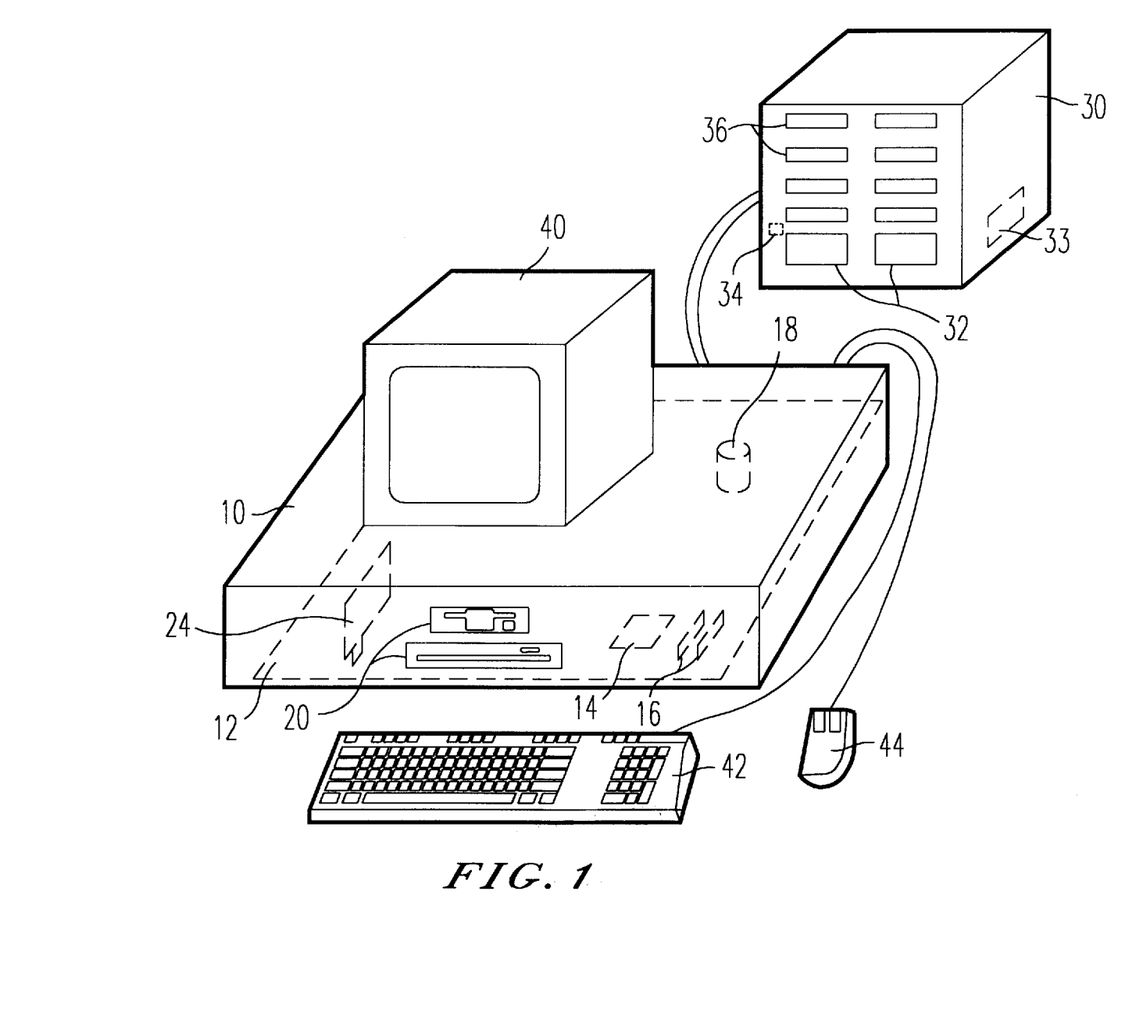
FIG. 1 is a schematic of a computer system attached to a jukebox according to an embodiment of this invention.

Referring now to the drawings, wherein like reference numerals designate identical or corresponding parts throughout the several views, FIG. 1 is a view showing a computer system 10 attached to a jukebox 30 which represents a system according to one embodiment of the present invention. Computer 10 comprises a motherboard 12 housing a microprocessor 14, memory 16, high capacity storage media (i.e., hard disk(s)) 18, removable storage media 20 and an adaptor card 24. The computer system 10 is attached to a computer monitor 40, a computer keyboard 42, a mouse 44 and a jukebox 30. The jukebox 30 houses two drives 32 and multiple removable storage media 36. Alternatively, (although not shown in FIG. 1) the jukebox 30 could house only a single drive 32, depending on the jukebox configuration. In another embodiment of the present invention, the jukebox 30 also houses a hard disk which is used as a cache of frequently used sectors from different removable media of the jukebox 30. In yet another embodiment the jukebox 30 is fitted with a bar code reader 34 so that the disc may be identified by the jukebox without actually being read. The removable storage media would be labeled with corresponding numeric or alpha-numeric bar codes to aid in human recognition of the labels. Examples of commercially available jukebox systems are the HP SureStore Optical 20xt which has 1 drive and stores 16 cartridges, the 40st which has 2 drives and stores 32 disks, the 80st which has 4 drives and stores 64 disks and the 100st which has 2 drives and stores 76 disks.

Stored on the high capacity storage media 18 are programs for controlling the computer system 10 and the jukebox 30. These programs include (but are not limited to: operating system programs (Netware, DOS, OS/2, Windows, Windows NT, UNIX, Linix, etc.), jukebox control programs (Netware Loadable Modules (NLMs), device drivers, media configuration tools, jukebox configuration programs, programs to update jukebox firmware, etc.) and application programs which manipulate data stored on the media in the jukebox. The means for writing device drivers and the drive controlling software varies depending on the system used. Standard Software Developers Kits (SDKs) are readily available for Netware, OS/2, Windows, MS DOS and others, and the books for the Netware SDK, especially NLM development and Tools overview will aid in the understanding of how to write device control software. The contents of these SDKs, including the electronically readable source code, is incorporated herein by reference.

Figures 2A, 2B, 2C:
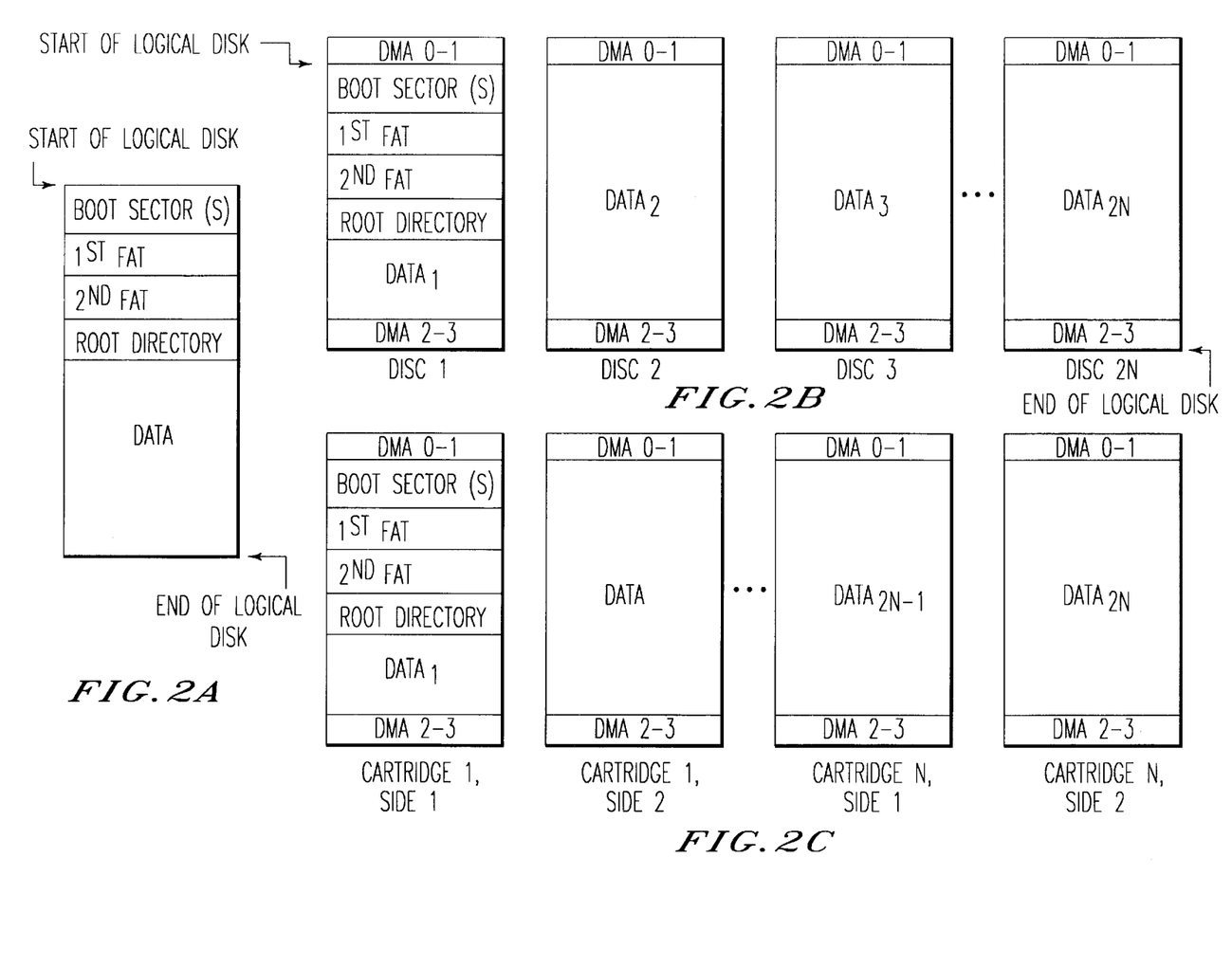
FIG. 2A is a schematic of a logical structure for a simulated disc which actually spans multiple physical media.
FIG. 2B is a schematic showing a first method of partitioning the sectors of the logical disk wherein the sectors of the logical disk span 2N single-sided discs.
FIG. 2C is a schematic showing a second method of partitioning the sectors of the logical disk wherein the sectors of the logical disk span N double-sided cartridges with the sectors assigned contiguously from one side to the next.

According to one embodiment of the present invention, the jukebox and associated control software of FIG. 1 are implemented to provide a logical view of a large disc or volume as shown in FIG. 2A. Although a conventional DOS format has been chosen for illustrative purposes in FIGS. 2A–2D, FIG. 2E shows an additional format, Netware-style, and, based on the present invention, it would be readily apparent to one of ordinary skill in the art how to employ the present invention to create other formats for other systems (HPFS, UNIX-style virtual and logical file systems, etc.), it thus being understood that the present invention is not restricted to any particular format shown. For illustrative purposes, in the first method of partitioning the sectors/clusters, FIG. 2B shows that a logical disk can be created from 2N single-sided discs with the File Allocation Table(s), root directory and some data on the first disc and other data (including directory information) on the remaining three discs. Because the discs are single-sided, the relationship of which disc contains the sectors which are the continuation of another disc is less important than for double-sided cartridges because the data is stored independently.

Figure 2D:
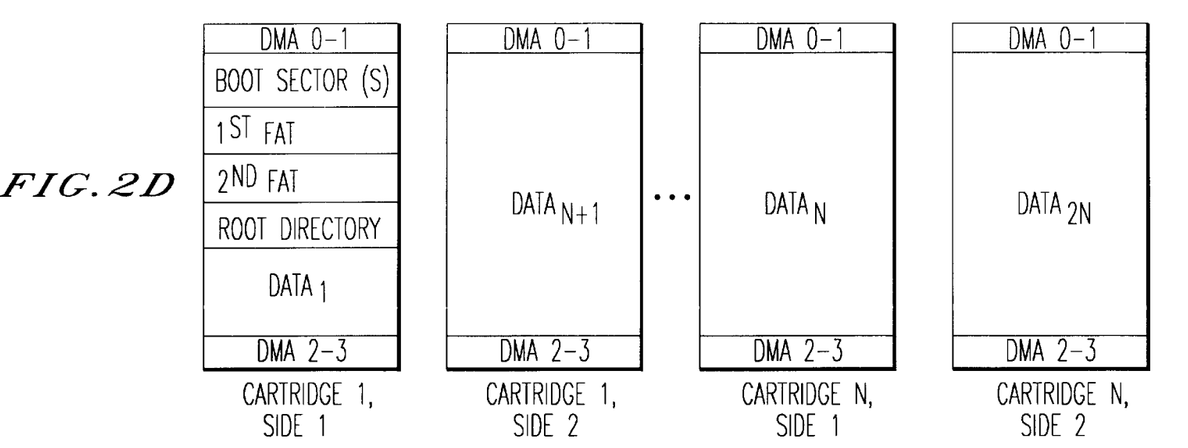
FIG. 2D is a schematic showing a third method of partitioning the sectors of the logical disk wherein the sectors/clusters are not assigned contiguously to reduce disc swapping time.
Figure 2E:
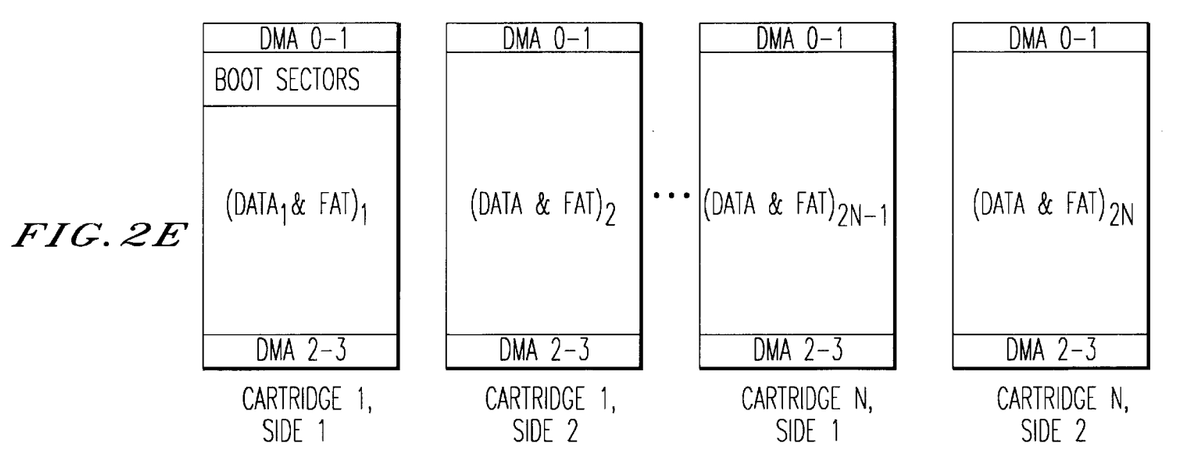
FIG. 2E is a schematic showing another method of partitioning the sectors/clusters of a logical disk with a different logical structure than FIG. 2A, wherein the File Allocation Table (FAT) and the data (including directory information) are intermixed.

However, as shown in FIGS. 2C and 2D, for double-sided cartridges, the user/administrator of the jukebox must decide how the data is to be partitioned when the jukebox can only read/write one side per drive at a time. For jukeboxes with a single read/write head per drive, if data is written contiguously, then files may be split across cartridges or the file may be split onto opposite sides of the same cartridge. This potentially requires that a cartridge be flipped when reading an entire file. For single-drive jukeboxes, this penalty of changing media cannot be avoided; either the cartridge must be flipped or a different cartridge must be inserted. However, for jukeboxes with multiple drives, some of the penalty can be removed depending on data layout. A file crossing a media boundary receives no extra benefit from multiple drives if the data required is on both sides of the same cartridge. When data is written contiguously in a file this is more likely to occur in FIG. 2C than FIG. 2D because of locality of reference. When using two drives, the data layout of FIG. 2D would enable the beginning and end of a file crossing a media to be read simultaneously by putting the two cartridges in separate drives.

To create the logical disks an application is run on the computer system 10 which requests the numbered discs to be used in the disc set. Each disc is then formatted and a hidden zeroth sector is constructed which contains the set information. An illustrative embodiment of the set information is shown below in a C language structure.

```
typedef struct ZerothSectorinfo
{
    BYTE Signature[64];
```

-continued

```
    BYTE SetName[16];
    LONG NumberOfCartridges;
    LONG CartridgeNumber;
    LONG CartridgeSide;
    LONG SectorSize;
    LONG StartingSector;
    LONG EndingSector;
    LONG TotalSectorsPerSide;
    LONG TotalDeviceSize;
    BYTE Resvd0[16];
    BYTE Resvd1[128];
    BYTE Resvd2[256];
}ZerothSector;  //512 Bytes (One sector).
```

To aid in proper storage of the discs when a disc is ejected for the first time, the system will prompt the user with a label name to be attached to the ejected disc. This prevents a user from having to insert each unlabeled disc into the jukebox to determine to which set the unlabeled disc belongs. However, should a label be destroyed, the information can be read from the zeroth sector by the system and the user can be prompted with the appropriate name for the disc. Additionally, each disc can be labeled with a bar code which can be read by bar code reader 34 without having to actually read the contents of the removable storage media 36. This analysis of which media are present in the jukebox can be done during low load periods, such as at night. Additionally, to ensure that discs are properly labeled, the system may require that a removable storage media 36 be labeled after being initialized and then reinserted into the system so that the bar code may be verified.

Additionally, during the formatting of plural removable storage media 36 that comprise a set of media forming a logical disk, the defect management area (DMA) is read to determine the sectors marked as defective in the primary defect list and any additional defective sectors are added to a secondary defect list and substituted with additional sectors on the discs which are reserved for "hot swaps." In this way, the defective sectors can be avoided seamlessly by using the information in the defect management area. However, to avoid a loss of the use of a cartridge due to an error in one of the sectors which comprises the DMA, four copies of the DMA are stored on a cartridge, two at the front and two at the end of the cartridge. Because the $DMA_0$ is used by the jukebox to determine where to find the zeroth sector information, damage to the $DMA_0$ is especially severe. Therefore, an additional object of the present invention is to provide a means for updating a damaged copy of the DMA by comparing existing copies of the DMA that are not damaged and reconstructing a DMA copy by using non-defective copies of the DMA. A simple majority of the DMA copies can be used as a strong indication that the correct value should be the same as the majority of the DMA copies. In this way, a damaged DMA can be reconstructed so that a cartridge can continue to be used.

Because of the chance for media defects, the present invention also encompasses a means for diagnosing the media, the drives in a jukebox, and the jukebox. During quiescent times, media diagnostics can be run to analyze the number of sectors that are damaged and therefore written to the secondary defect list. If this number of sectors increases beyond a user threshold, the media will be marked as read only and removed from the system to prevent further errors. The media may be copied later to create a new working version of the discs so that a logical disk/volume may be saved in the presence of errors.

Figure 3:
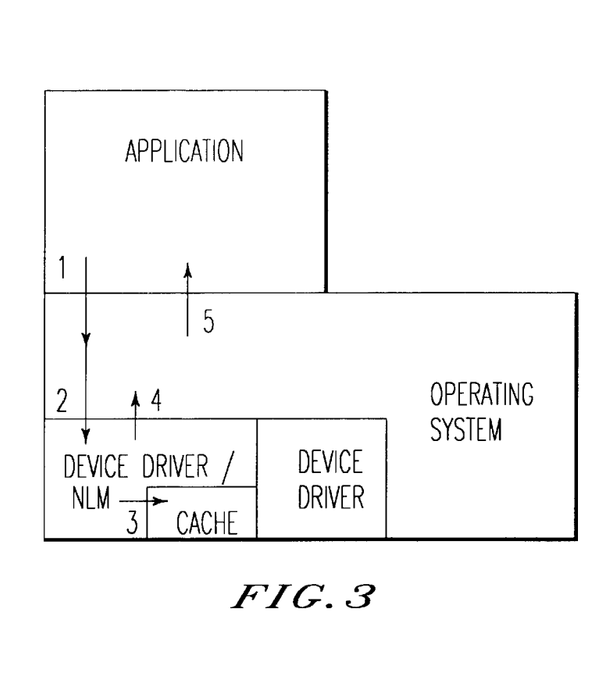
FIG. 3 is a schematic showing the logical structure of how read and write requests propagates from an application to the jukebox and how the result is returned to the application.

The general operation of the present invention is described with reference to FIG. 3. In FIG. 3 an application makes a request for a disc sector by calling an operating system function which passes the request from the application to the operating system. The operating system determines the nature of the request from the application and translates the request as necessary to convert from a file name to a desired device or from a file handle to a desired device. Having determined the type of request from the application, the operating system requests a sector from the appropriate device driver or NLM controlling the device storing the sector. In the case of a request for a sector contained in the jukebox 30, the request is processed by examining the contents of the cache with reference to which media is currently in the drive. In the case of a write to the jukebox 30, a result is passed from the device driver to the operating system indicating that the write completed, even though the data may not actually have been written out to the media, and the result is then passed from the operating system back to the application. In the case of a read from the jukebox 30, the result code and the data corresponding to the requested sector are passed from the device driver to the operating system where the operating system returns the data and result to the application. The cache of the system can either be a separate RAM cache for each drive in the jukebox 30, a unified RAM cache for all drives in the jukebox 30 or a hard disk, inside the jukebox, dedicated to the jukebox 30 but inside the computer system 10 or inside the computer system 10 and shared between the computer system 10 and the jukebox.

Figure 4:
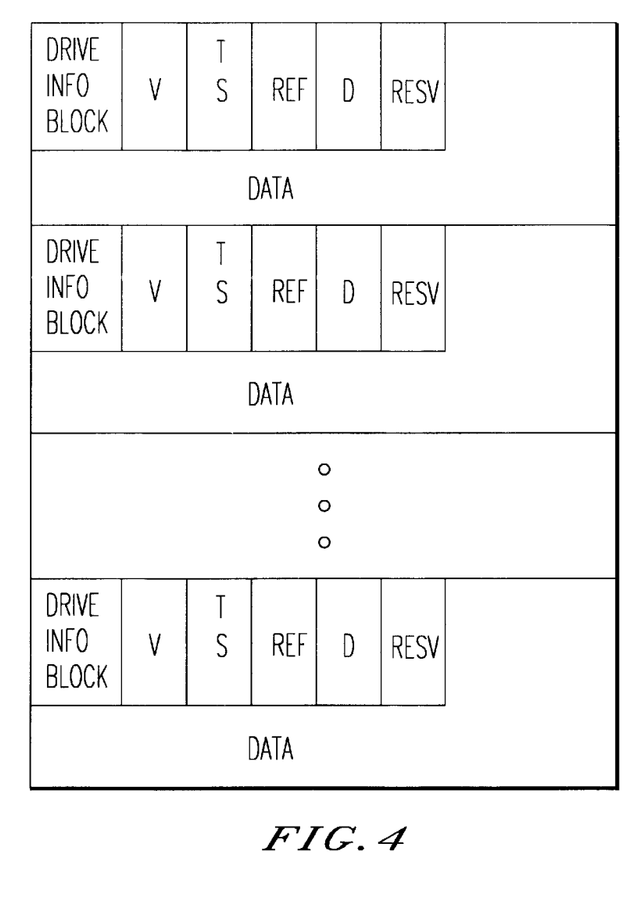
FIG. 4 is a schematic showing plural entries of a cache.

FIG. 4 shows an illustrative embodiment of the cache used by the present invention. Each cache entry contains space for not only the data but also the status information required. Because writes or reads from several different media can be cached in the same cache, each cache entry must contain an indication of which media the data corresponds to. This information is stored in a drive information block so that the information may be flushed when appropriate or read from the cache in the absence of the media on which it physically resides. Additionally, each cache entry contains additional bits describing whether a cache entry is valid, what the time stamp of the last access was, a reference count, a dirty bit and additional reserved bits. When the cache is initially created, all the valid bits are set to zero as the cache has not yet been filled. When an entry is used, either for storing a write or providing a cached sector in response to a read request, one embodiment of the present invention updates the time stamp so that a least recently used entry may be determined. In another embodiment of the present invention, the reference count of a cache entry is updated to perform reference counting so that "hot" or frequently used entries are not flushed unnecessarily. To maintain an accurate representation of how often each entry is used, periodically the reference counts are checked for activity and subsequently set to zero to begin a new period for examination.

In an embodiment in which both reads and writes are cached, a dirty bit is provided to indicate to the system whether or not a cache entry is consistent with its corresponding entry on its corresponding media. When a cache has a predetermined utilization and non-dirty entries exist, these entries may be discarded immediately without updating their corresponding media because their current value is consistent with their saved value. This enables a system performing read and write caching to have greater control over its replacement strategy and to provide faster replacements when the cache has a predetermined utilization.

Next, the operation of the method of the first embodiment will be described. Throughout the discussion, the term sector will be used to denote the block size of data to be read or written according to the request received, although it should be understood that request may be for plural sectors, a cluster of sectors (the base unit for the number of sectors assigned to a file each time a file is created, it is also the size unit used in the FAT to describe what parts of the disc are used, free, reserved, part of a chain, etc.) or any other size. The size of the requests also need not be the same in each request, but a "sector" is used for convenience and clarity. Also, the cache of the system need not actually become full before the present invention can provide benefit; because the size of requests can vary, the present invention determines if the cache has a predetermined utilization, and flushes the cache upon reaching this predetermined utilization.

Figure 5:
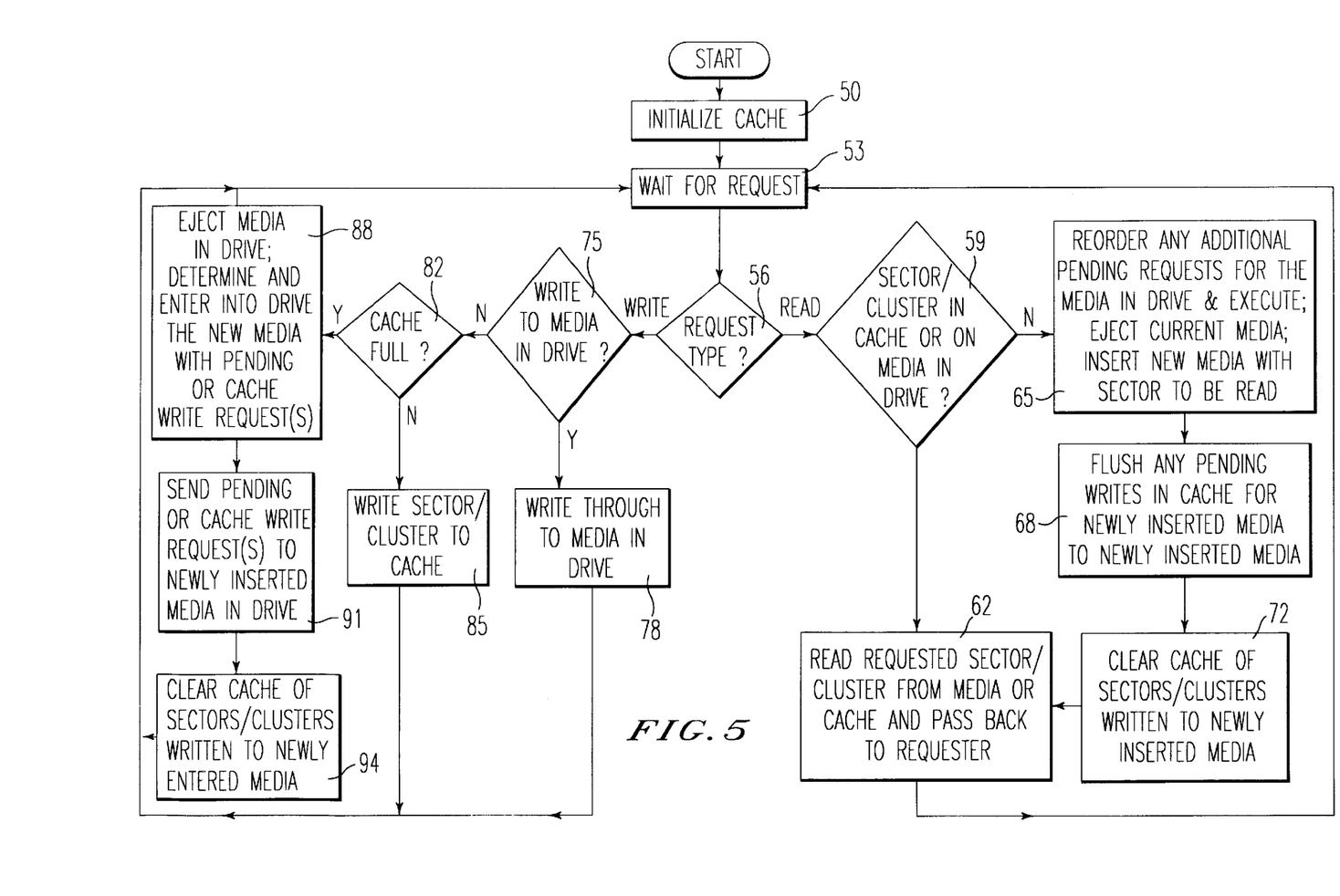
FIG. 5 is a flowchart showing an embodiment of a write caching method used in the present invention to increase performance and reduce wear on mechanical components of the jukebox.

FIG. 5 is a flowchart describing the operation of the method of using a write cache to improve the efficiency of a jukebox. The method uses a faster storage device or devices as a cache for the sectors to be written to the media in the jukebox. These cache devices can be RAM, hard disks, flash memory, or a combination of any. The RAM is advantageous in that it is the fastest of the cache devices, but is limited in size by the size of the memory 16 in the computer system 10, the amount of RAM on the jukebox controller, if any, and the amount of RAM in the jukebox, if any. RAM in the computer system 10 is also disadvantageous in that it consumes memory which could be used for applications, and its contents are lost when the computer system 10 crashes or loses power. For this reason, RAM caches should be supported by an uninterruptable power supply. RAM is also disadvantageous in its cost, although the cost continues to decrease as larger density memory chips become available.

Flash memory has the advantage of good read access time, better write access time than a hard disk or magneto-optical disc and its preserves it contents after memory has been lost. It, therefore, is not subject to corrupting the magneto-optical discs in case of power failure. Flash RAM however has a limited number of times that it can be written to and it is still expensive. Hard drives have the advantages of cost and being a stable storage device which aids in recovering from crashes, but hard disk drives are the slowest caching media of the three. However, a hybrid approach could be used with RAM or Flash being a primary cache and the hard disk being a secondary cache, but a hard disk will provide the highest reliability. In addition, because of the size of the hard disk, all the FAT entries of the cartridges in a set or volume could be stored on a hard disk, even if the FATs are tens of megabytes large, which it typically too large for a RAM cache. Since the FAT entries are some of the most used sectors, the FATs can be stored/cached by simple reference counting techniques without having to know which sectors contain FAT information. At step 50, the method is started by initializing the cache to an empty state because no requests have been received yet. Typically this step would occur at device driver initialization time or when an NLM is loaded or reset. The process continues on to step 53 where the device driver or other means for performing the present invention receives a sector request corresponding to an area of the logical disk that is to be either read or written by the jukebox. The request that was received is analyzed in step 56 to determine if it is a read request or a write request. If the request is a read request, the processing continues on in step 59 where the method determines if the sector is in the cache or on the media (i.e. disc or cartridge) in the drive. If step 59 determines that the sector is in the cache or on the media in the drive, processing continues with step 62 where the sector is read from the media in the drive or the cache, as appropriate, and the requested sector is passed back to the requester. After step 62, processing returns to step 53 where the means for implementing the caching method waits for the next sector request.

If in step 59 it is determined that the read request is for a sector that is neither in the cache nor on the media in the drive, processing continues with step 65 which determines if there are any other pending requests for the media in the drive, and if so, reorders the requests so that all requests corresponding to the media presently in the drive are processed first. If there are no other requests for the present media, then the system ejects the current media from the drive, inserts the new media with the requested sector to be read into the new drive and then continues to step 68. In step 68, the system implementing the caching algorithm takes the opportunity to flush out to the newly inserted media any cached write requests which were delayed because the media was not previously in the drive. Having flushed the pending write requests, step 72 continues the process by clearing the cache of the sectors written to the newly inserted media because the contents have been written to the media. These sectors are no longer needed in the cache because they can be read directly from the drive and flushing provides additional room for write requests to media not currently in the drive. Having completed step 72, processing continues with step 62 wherein the requested sector is read from the media and passed back to the requester, after which the method again waits for the next sector request in step 53. In an alternate embodiment, steps 68 and 72 are delayed until between steps 62 and 53 so that the read request can be completed as soon as possible and the requester can be released.

If step 56 determines that the received request is not a read request but rather a write request, processing transitions from step 56 to step 75 where the method determines if the media to be written to is currently in the drive. If step 75 determines that the desired sector resides on the media in the drive, processing continues to step 78 where the sector is written through to the media in the drive, whereafter processing returns to step 53 to await a next request. However, if step 75 determines that the sector to be written to does not correspond to the media presently in the drive, processing moves to step 82 to determine if the cache currently has a predetermined utilization. If step 82 determines that the cache currently does not have a predetermined utilization, processing continues to step 85 where the sector is written to the cache and whereafter processing returns to step 53 to await another request. In an alternate embodiment, step 82 can also determine if the number of cached writes to any one media is higher than a preset threshold, and if so, the method also continues with step 88 so that cache clearing process of steps 88–94 is performed.

However, if step 82 determines that the cache has a predetermined utilization, processing moves to step 88 to begin the process of either clearing part of the cache to make room for the sector to be written or placing the media corresponding to the sector to be written into the drive to enable the write to complete. Step 88 ejects the media presently in the drive and determines a new media to insert into the drive based on the pending write request and previous cached write requests. (The method for determining which media to enter into the drive will be explained in more detail later.) In an alternate embodiment, step 88 reorders any pending requests for the media presently in the drive and executes those requests before ejecting discs, thereby reducing the number of disc swaps and increasing performance. The processing moves from step 88 to step 91 where at least one of the pending and cached write requests is sent to the newly inserted media in the drive. In step 94 the cache is cleared of any sector written to the newly entered media. Regardless of what is cleared from the cache, processing moves from step 94 back to step 53 where the system awaits the next sector request. In an alternate embodiment, the entire cache is cleared by writing each cached entry to its corresponding media, with all cached requests for one media being sent to a media before switching to the next media. In a multi-threaded environment, the write request can complete and the requester can be freed before all entries are actually flushed. This too enhances performance.

Returning to step 88 to describe the method of determining which media with pending or cached write requests is to be inserted into the drive, either a short term or any one of several long term approaches can be used. Because disc read and write requests exhibit spatial locality of reference (a characteristic by which, when one part of a file is read or written, the parts of the file around the presently read or written part are also read or written with a high probability within a short time), a short term approach inserts the media corresponding to the currently pending write in anticipation of subsequent writes to the same media. Furthermore, since the cache has a predetermined utilization, there are potentially previously cached writes corresponding to that media which were cached before the cache reached its current utilization which can also be flushed.

However, long term approaches use any one of more complex methods for determining which media is to be entered into the drive. Examples of long term approaches are: choosing the media corresponding to the greatest number of cached writes and choosing the media corresponding to the oldest cached write in the cache, also known as the least recently used (LRU) method. To determine the media with the greatest number of cached entries, the status information of the cache is examined and a corresponding media counter is incremented each time a cached write request is found. In an embodiment performing the LRU method, each write request must be time stamped so that the time stamps can be examined when determining which media to enter. These time stamps additionally are updated when a sector is read to prevent a sector which is written infrequently but read frequently from being cleared from the cache.

Figure 6A:
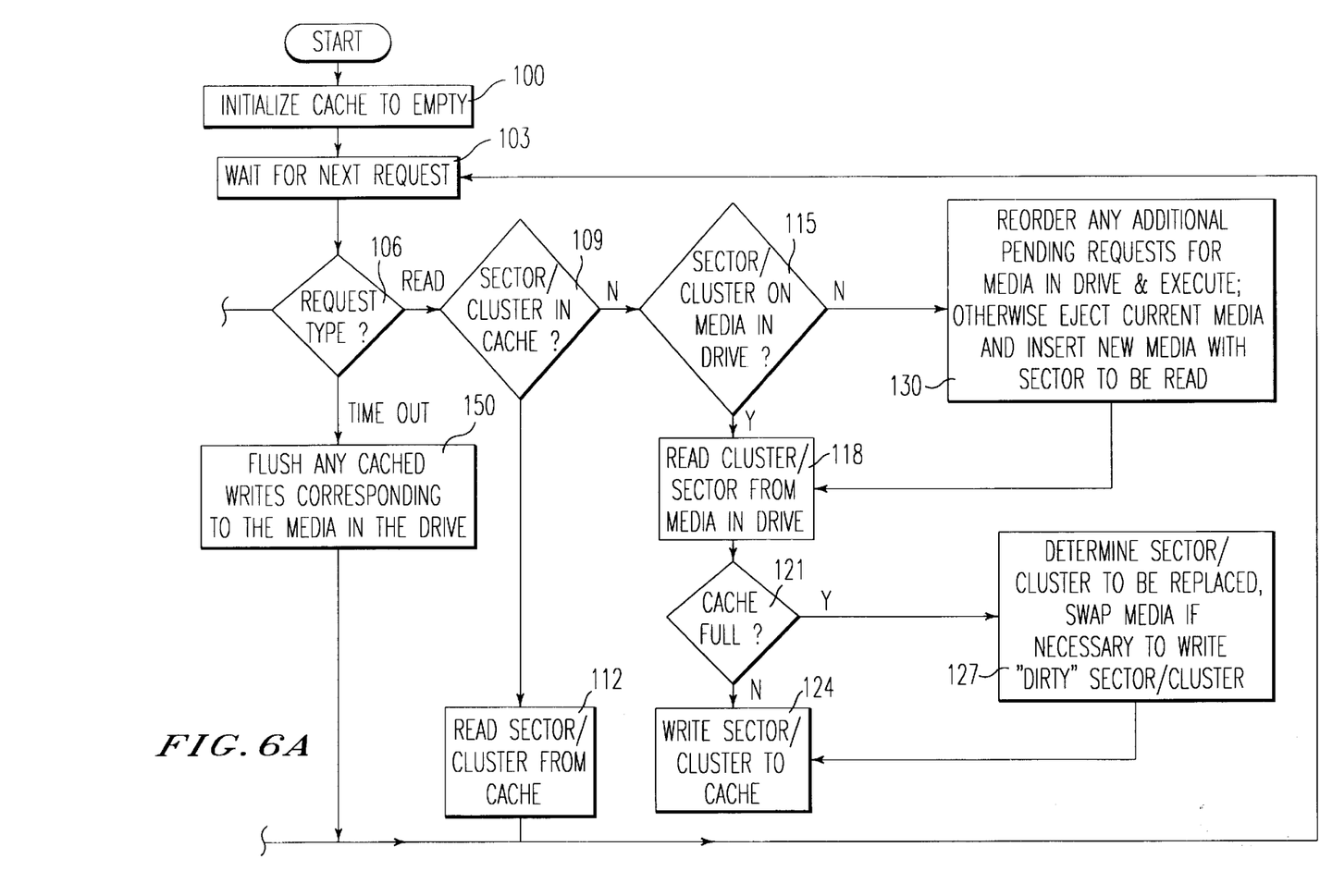
FIG. 6 is a flowchart showing an embodiment of a read/write caching method used in the present invention to increase performance and reduce wear on the mechanical components of the jukebox.
Figure 6B:
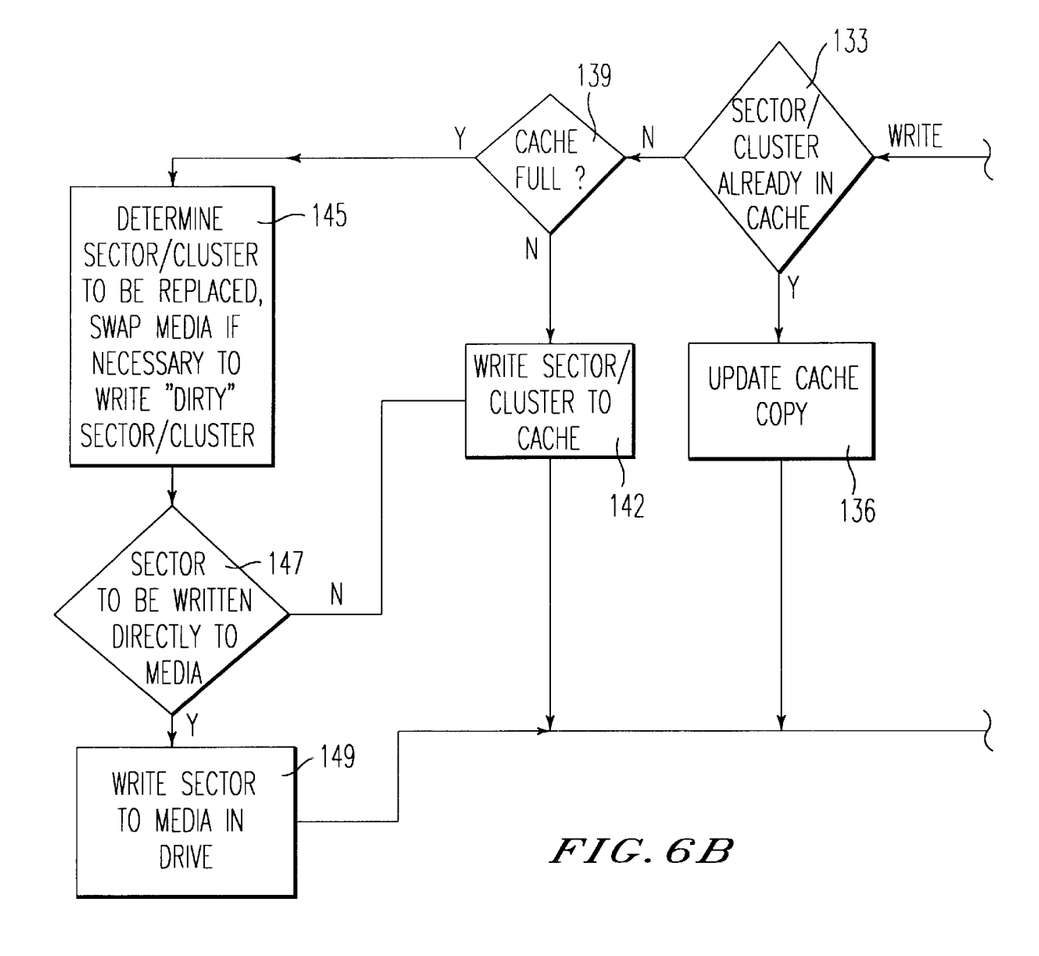

Turning now to the flowchart of FIG. 6 which illustrates the more complex caching out method implemented by the second embodiment of the present invention, the method begins with step 100 in which the cache is initialized to an empty state. Processing then continues with step 103 wherein the apparatus implementing the method waits for the next request to be received. Upon receiving a request, processing continues with step 106 where the type of request is determined to be one of a read request, a write request or a time out notification. Having determined in step 106 that a read has been requested, processing continues with step 109 to determine if the requested sector to be read is currently in the cache. If step 109 determines that the sector is present, then the sector is read from the cache in step 112 and processing continues to step 103 wherein the system waits for the next request to be received.

However, if step 109 determines that the requested sector to be read is not in the cache, then a subsequent check is performed in step 115 to determine if the sector is on the media in the drive. Step 118 follows step 115 when the sector to be read resides on the media currently in the drive, and the sector then is read from the media in the drive in step 118. Because the second embodiment is a full caching method, processing continues in step 121 to determine where in the cache to put the sector read from the media. If in step 121 it is determined that the cache does not have a predetermined utilization, then processing continues with step 124 and the sector is written to an empty entry in the cache.

However, if step 121 determines that the cache has a predetermined utilization, then processing moves from step 121 to step 127 wherein the method determines a sector to be replaced in the cache and performs media swapping if it is necessary to write a "dirty" sector to a media not currently in the drive. In an alternate embodiment, read requests will be reordered to allow all read requests for the present media to complete, uncached if necessary, before ejecting the cartridge presently in the case. After having freed a sufficient number of entries in the cache in step 127, processing continues in step 124 wherein the sector read in step 118 is written to the cache. Having completed step 124, either when the cache was only partially full or after having freed an entry in the cache, processing continues with step 112 wherein the sector is sent from the cache back to the requester. Having completed a read cycle, processing restarts with step 103 wherein the system waits for the next request.

If, however, in step 106 the method determines that a write request has been received, step 133 determines if the sector to be written is already in the cache. If so, step 136 is executed to update the cached copy and return to step 103 to await the next request. However, if step 133 determines that the sector to be written is not already in the cache, step 133 is followed by step 139 which determines if the cache currently has a predetermined utilization. If step 139 determines that the cache does not yet have a predetermined utilization, the sector is added to the cache in step 142 and the next request is awaited in step 103. However, if step 139 determines that the cache has a predetermined utilization, the method progresses to step 145 wherein the method determines a sector to be replaced in the cache, which includes swapping media if necessary to write a "dirty" sector to media currently not in the drive. Based on the calculations of step 145, it may be determined that it is more beneficial to write the current request directly to its corresponding media. If step 147 determines that the entry is to be cached, then having freed a sufficient number of entries to write in step 145, processing continues with step 142 wherein the sector/cluster is written as requested so that processing is restarted with step 103. However, if step 147 determines that the sector is to be written directly to the media, then it is written in step 149 and processing is restarted in step 103. Step 149, in an alternate embodiment, clears the whole contents of the cache by writing all the cached writes of a corresponding disc/cartridge to that disc/cartridge before changing to the next disc/cartridge. The written sector can be written to the fresh cache or not depending on the systems requirements.

An additional type of request which can be received by step 103 and determined by step 106 is the time-out notification. Step 150 enables the system to flush any cached writes corresponding to the media currently in the drive to make the cached copies and the copies physically stored on the cartridges coherent in case of a system crash. Step 150 may also determine that the media should be switched so that other entries can be flushed, or in anticipation of needing a different media. In addition, by flushing any cached writes while the drive is not otherwise busy, efficiency is increased by reducing the number of operations which must be performed simultaneously and by reducing the number of "dirty" entries which potentially would need to be flushed from a cache that has a predetermined utilization when a new cache entry is added.

In addition to the above two embodiments of the present invention described in relation to FIGS. 5 and 6, third and fourth embodiments of the present invention can be implemented using the methods of the first and second embodiments but using plural drives instead of a single drive so that in steps 65, 88, 130 and 145, the system determines which of the plural drives is to have its media removed and replaced with a different media. This determination can be made based a number of factors including the least recently used media, the media corresponding to the drive used least frequently on average over a predetermined time period, or the media with the fewest dirty sectors after having flushed the sectors. In order to support such approaches, reference counts are kept which record how frequently each drive is used. This also reduces the number of requests that must be reordered based on pending requests that should be reordered before ejecting the media currently in a drive. In one embodiment, a drive without pending requests has its media switched if the others having pending requests for the media in their drive and a new media is required.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letters Patent of the United States:

1. A system for reading data from and writing data to a jukebox including at least one drive and plural removable media, the system comprising:

a cache including plural entries for storing sectors corresponding to sectors on the plural removable media; and a controller for reading data from and writing data to the cache, the controller comprising:

means for writing data to the cache when a current media in the at least one drive does not contain a sector to be written, means for writing data to a sector of the current media when the current media contains the sector to be written, and means for flushing the cache to respective media.

2. The system according to claim 1, wherein the means for flushing the cache comprises a means for flushing the cache to respective media when the cache is at a predetermined utilization but is not full.

3. The system according to claim 1, wherein the means for flushing the cache comprises a means for flushing the cache to respective media when the number of cached writes to any one media is higher than a threshold.

4. The system according to claim 1, wherein the cache comprises:

a cache on a hard disk for storing most frequently used sectors;

a RAM cache for caching less frequently used sectors; and a reference counting unit for reference counting accesses to sectors to determine assignments to the hard disk and RAM cache; and wherein the means for writing comprises means for writing a sector to one of the cache on the hard disk and the RAM cache based on the reference count for the sector.

5. A system for reading data from and writing data to a jukebox including at least one drive and plural removable media, the system comprising:

a cache including plural entries for storing sectors corresponding to sectors on the plural removable media;

means for initializing the cache;

means for receiving a media request;

means for determining a type of the received media request as one of a read and write request;

means for reading and returning a sector from the cache if the read request requests a sector stored in the cache;

means for reading and returning a sector from a current media in the at least one drive if the read request requests a sector stored on the current media;

first means for changing to a new media;

means for returning data of a sector from the new media;

means for writing data of a sector to the current media if the write request requests data of a sector on the current media be stored;

means for writing data of a sector to the cache if the write request requests that data of a sector not on the current media be stored and the cache does not have a predetermined utilization;

second means for changing to a new media when the cache has a predetermined utilization; and means for writing data of a sector from the cache to the new media.

6. The system according to claim 5, wherein the first means for changing to a new media comprises:

means for ejecting the current media from the at least one drive if the read request is for data of a sector not stored in the cache and not stored on the current media;

means for determining a new media to be inserted into the at least one drive if the read request is for data of a sector not stored in the cache and not stored on the current media; and means for inserting the new media.

7. The system according to claim 5, wherein the second means for changing to a new media comprises:

means for ejecting the current media from the at least one drive if the write request is for data of a sector not stored in the cache and not stored on the current media when the cache has a predetermined utilization;

means for determining a new media to be inserted into the at least one drive if the write request is for data of a sector not stored in the cache and not stored on the current media when the cache has a predetermined utilization; and means for inserting the new media.

8. The system of claim 6, wherein the first means for changing to a new media further comprises:

means for reordering and executing any additional requests for the current media in the at least one drive if the read request is for data of a sector not stored in the cache and not stored on the current media.

9. The system of claim 7, wherein the second means for changing to a new media further comprises:

means for reordering and executing any additional requests for the current media in the at least one drive if the write request is for data of a sector not stored in the cache and not stored on the current media when the cache has a predetermined utilization.

10. The system according to claim 6, wherein the first means for changing to a new media further comprises:

means for flushing any cached write requests for the new media to the new media; and means for clearing from the cache any sectors corresponding to the cached write requests flushed to the new media.

11. The system according to claim 7, wherein the second means for changing to a new media further comprises:

means for flushing any cached write requests for the new media to the new media; and means for clearing from the cache any sectors corresponding to the cached write requests flushed to the new media.

12. The system according to claim 6, wherein the means for determining a new media to be inserted comprises:

means for determining which of said plural removable media stores data of a sector corresponding to the read request.

13. The system according to claim 7, wherein the means for determining a new media to be inserted comprises:

means for determining which of said plural removable media stores data of a sector corresponding to the write request.

14. The system according to claim 7, wherein the means for determining a new media to be inserted comprises:

means for determining the media corresponding to the greatest number of cached writes.

15. The system according to claim 7, wherein the means for determining a new media to be inserted comprises:

means for determining the oldest cached sector in the cache.

16. The system according to claim 5, wherein the cache comprises a RAM cache.

17. The system according to claim 5, wherein the cache comprises a hard disk.

18. The system according to claim 5, wherein the cache comprises a flash memory.

19. A control system for caching writes to a jukebox including at least one drive and plural removable media, the control system comprising:

a cache;

means for writing data to the cache when a current media in the at least one drive does not contain a sector to be written;

means for writing data to a sector of the current media when the current media contains the sector to be written; and means for flushing the cache to respective media.

20. The system according to claim 19, wherein the means for flushing the cache comprises a means for flushing the cache to respective media when the cache is at a predetermined utilization but is not full.

21. The system according to claim 19, wherein the means for flushing the cache comprises a means for flushing the cache to respective media when the number of cached writes to any one media is higher than a threshold.

22. The system according to claim 19, wherein the cache comprises:

a cache on a hard disk for storing most frequently used sectors;

a RAM cache for caching less frequently used sectors; and a reference counting unit for reference counting accesses to sectors to determine assignments to the hard disk and RAM cache; and wherein the means for writing comprises means for writing a sector to one of the cache on the hard disk and the RAM cache based on the reference count for the sector.

* * * * *